A. C. GARRATT.
Axle-Lubricator.
No. 14,310. Patented Feb. 26, 1856.
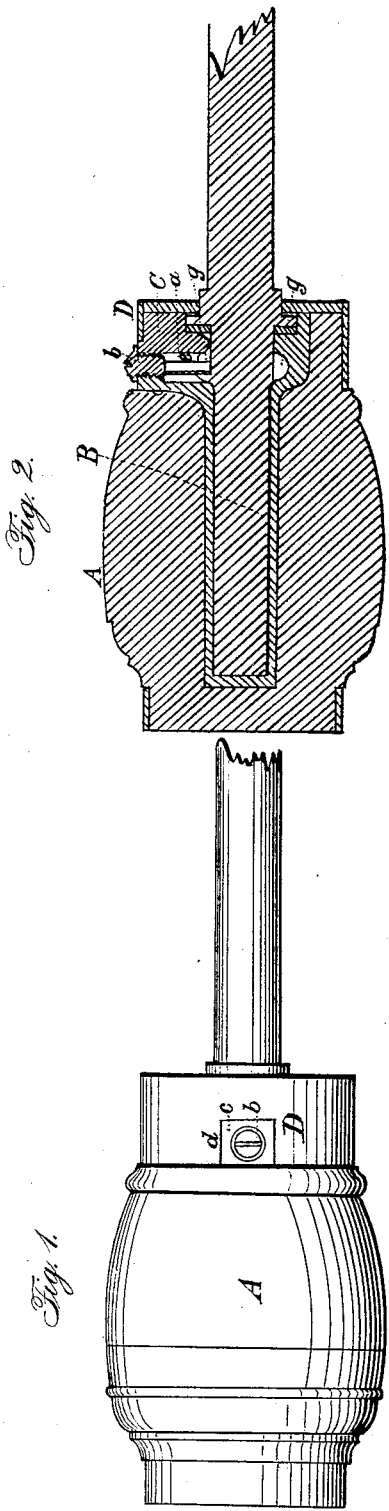
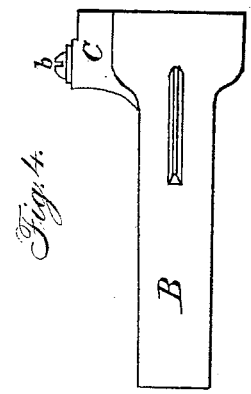
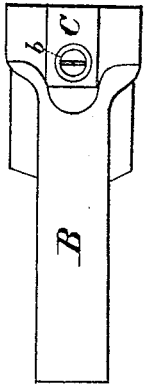
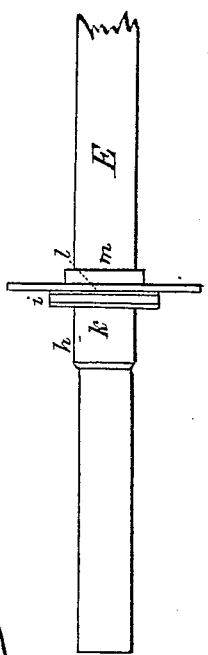
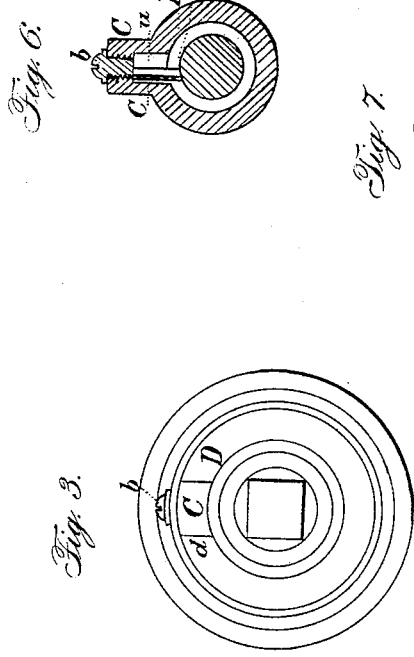

UNITED STATES PATENT OFFICE.

ALFRED C. GARRATT, OF ROXBURY, MASSACHUSETTS.

BOX FOR CARRIAGE-HUBS.

Specification of Letters Patent No. 14,310, dated February 26, 1856.

*To all whom it may concern:*

Be it known that I, ALFRED C. GARRATT, of Roxbury, in the county of Norfolk and State of Massachusetts, have invented an Improved Combination Wheel-Box; and I do hereby declare that the same is fully described and represented in the following specification and the accompanying drawings, of which—

Figure 1, exhibits a top view of a wheel hub having my invention applied to it; Fig. 2, a longitudinal and vertical section of the same; Fig. 3, an inner end view of it; Fig. 4, a side view of the box, as removed from the wooden hub; Fig. 5, a top view of the same. Fig. 6 is a transverse section of the hub, taken also through the box, axle and the oiling apparatus.

In these drawings A, represents the wooden hub of a carriage wheel provided with its axle. Over the mouth or the inner end of the axle box, there is elevated a projection C, the same being cast or forged in one piece with the box, or otherwise fixed to it so as to be a part of the box. Down through the projection C is made an oil passage A, which leads directly into the common annular recess groove, made within the box as seen at G, as seen also in Figs. 2 and 6. The oil passage is formed with a female screw to receive the male screw of the labyrinth plug *b*, all for the purpose of keeping a clear and free passage for the oil, or other lubricating material down to the said recess or oil chamber and to the journal of the axle; also at the same time for receiving and self-removing the decarbonized oil and dirt which is called wheel-grease, and then for closing the oil passage.

In Letters Patent granted me on the 16th of January 1855, I have shown and exhibited a plug essentially like that above specified, and I have there stated the object and operation of such like plug, also the mode of applying or inserting the same into the wooden wheel hubs, it being described in said patent or specification, as adapted and screwed into a tube, or socket, which tube is to be sunk or inserted transversely into and through the body of the wooden hub, and through the iron so as to reach the journal of the axle. But I wish it to be distinctly understood that this present invention has particular reference to a peculiar combination wheel box, in which is an arrangement of the oil socket and grease plug or lubricator with the oil chamber within the box as specified, so that boxes thus made arranged and provided shall become a complete and marketable article, and ready for use.

The purpose of arranging and combining the recess groove that is made within the box, as seen at *g*, with respect to the oil socket passage and the labyrinth of its plug, is not only to enable the socket to receive and retain more oil, or for it to pass more directly and freely around the axle than it otherwise could, but it also serves as a kind of trough for the reception of the worn-out wheel grease as it separates and escapes from the bearing or pressure of the axle. Then it accomplishes the final but most important purpose of leading or conducting all this foul and stiffening grease with dirt, directly and unavoidably into the receptacle or labyrinth of the socket plug of the lubricator, there ready to be self-drawn when the plug is removed for replenishing.

I am aware that the recess groove such as described and shown is an old device for oiling axles, and I therefore do not claim this groove. I am also aware that the lubricator used and shown is not new as I have also declared in my specification. I therefore do not claim either of these as a part of my invention.

What I do claim, as new, is—

The combination and arrangement of this peculiar lubricator or its equivalent, with the recess groove or oil chamber of the box, in the manner set forth and shown in the drawings, so as to form an improved combination wheel box for carriage axles.

In testimony whereof, I have hereunto set my signature this first day of January, A. D. 1855.

ALFRED C. GARRATT.

Witnesses:
R. H. EDDY,
F. P. HALE, Jr.